Patented Aug. 21, 1945

2,383,097

UNITED STATES PATENT OFFICE 2,383,097

BITUMINOUS COATING COMPOSITIONS AND PROCESSES

Bruce Weetman, Glenham, N. Y., assignor, by mesne assignments, to The Texas Company, New York, N. Y., a corporation of Delaware No Drawing. Application August 15, 1941, Serial No. 407,068

9 Claims. (Cl. 106—278)

My invention relates to bituminous coating compositions of improved adhesive properties, and to an improved method of coating mineral aggregates with bituminous materials to secure better adhesion between the bituminous material and the aggregate.

It is well known that mineral aggregates, and especially those of an igneous or siliceous nature, are difficult to coat with bituminous materials when moisture is present on the surface of the aggregate. Similarly, it is known that in service the bituminous materials tend to strip from the coated aggregates in the presence of water. In the past a number of expedients have been suggested for overcoming these difficulties, but none of these have been very satisfactory from a commercial standpoint.

I have now found that improved adhesive properties of bituminous coating materials can be secured by incorporating a phosphatide in the coating composition. Improved coating of wet mineral aggregates and improved stripping resistance of the coated aggregates can be secured by the use of these coating compositions, or by effecting the coating with ordinary bituminous materials in the presence of a phosphatide. I have found that even further improvement may be secured if the mineral aggregate is pretreated with lime prior to coating in the presence of a phosphatide.

The adhesive properties of other types of bituminous coating compositions, such as paints, cements, and the like, are also improved by the use of a phosphatide. However, the greatest difficulties in respect to lack of adhesion are encountered in bituminous paving materials for the coating of mineral aggregates, and my invention will be described with particular reference to such compositions.

In accordance with my preferred process for coating aggregates, the phosphatide is incorporated in the bituminous material, and the aggregate or lime-treated aggregate may then be coated with the resulting mixture in accordance with any of the conventional coating methods. However, other methods for effecting the coating in the presence of a phosphatide may also be employed, as for example, pretreating the aggregate with a phosphatide prior to the application of the bituminous coating composition.

If lime pretreatment of the aggregate is to be employed, this may be effected simply by adding lime to the aggregate and agitating the mixture to secure an even distribution of the lime. The water on the surface of moist aggregate will aid in securing an even coating of the lime, and, if a dry aggregate is to be treated, a small amount of water may suitably be added with the lime. The agitation may be effected in accordance with known methods for plant mixing operations, or by means of the standard blading and raking operations for road mixing.

The lime may be in any convenient form, such as unslaked lime, slaked lime, or materials which contain lime, such as Portland cement. The amount of lime to be employed will vary to a certain extent, depending upon the type of aggregate to be coated and the amount of moisture present on the aggregate. Generally, more lime is required in the case of igneous and siliceous aggregates than in the case of calcareous materials, and more lime is required for very wet aggregates than for those which are dry or only slightly moist. In general, however, from 0.1% to 0.5% of lime, calculated as $Ca(OH)_2$ based on the weight of the aggregate will be suitable, and I usually prefer to employ about 0.3%.

If desired, the phosphatide may be applied to the mineral aggregate, or to the lime-treated aggregate, prior to coating with the bituminous material. In such cases, the use of a solvent, such as kerosene or a very light bituminous surfacing material, will facilitate the distribution of the phosphatide on the aggregate. However, it is simpler and usually much more desirable to incorporate the phosphatide directly in the bituminous material to be used for the final coating operation.

Any of the phosphatides, such as lecithin or cephalin, may be used for this purpose, and crude commercial forms may be used as well as the pure materials. Generally, I prefer to employ lecithin or one of the commercially available concentrates prepared from soya beans or other sources high in lecithin. The optimum amount of phosphatide to be used in any particular case will depend to some extent on the nature of the aggregate to be coated and the amount of moisture present. It is usually desirable to employ more phosphatide when coating siliceous aggregates than when coating calcareous materials, and the amount of phosphatide should usually be greater for the coating of a wet aggregate than for coating a dry or only slightly moist aggregate. Concentrations of phosphatide ranging from 0.5% to 5.0% based on the weight of the bituminous material will usually be satisfactory, and I generally prefer to use from 1% to 3% of pure phosphatide or an equivalent amount of a crude phosphatide-containing material.

The coating of the aggregate or lime-treated aggregate with the bituminous material containing the phosphatide, or the coating with bituminous material of aggregate which has been pretreated with phosphatide or lime and phosphatide, may be effected in accordance with standard practices for plant mixing or road mixing operations. Molten bitumen or liquid bituminous material may be used, and application conditions which are suitable for coating aggregates in the absence of adhesion improving agents will be satisfactory for the coating operations when carrying out my present process.

My invention may be further illustrated by the following specific examples:

Example I

Dried aggregates of ¼ to ½ inch size were mixed with 1% by weight of water. One sample of each moistened aggregate was then coated with an asphalt cut-back comprising 73% of an airblown asphalt of 65–70 penetration and 27% of 140–400 naphtha distillate. The cut-back, which had a 122° F. Saybolt furol viscosity of 295 seconds, was applied by stirring with the aggregate for one minute.

Another sample of each moistened aggregate was similarly coated with an asphalt cut-back of the same composition but containing 2% of lecithin based on the weight of the cut-back.

Additional samples of the moistened aggregates were pretreated with lime by agitating with 0.3% by weight of slaked lime, and the resulting pretreated aggregates were then coated with the asphalt cut-back containing lecithin.

All of the coated aggregates were then subjected to curing for a period of 48 hours at 160° F., and the cured products were then subjected to the Nicholson stripping test (Proceedings of the Association of Asphalt Paving Technologists, Jan. 1932, page 43). This test was modified by adding a final test period at 140° F., and by visually estimating at the end of each test period the percent of exposed surface of the aggregate.

The degree of initial coating by the bituminous material, prior to curing, and the estimated percent of the aggregate surface exposed by stripping at the end of each period in the stripping test, are shown in the table below:

Example II

The procedure of Example I was followed, utilizing in place of pure lecithin a commercial lecithin concentrate marketed under the tradename of "Lipoidol." The test results obtained in this case are shown in the table below:

| Aggregate | Lecithin | Lime | Initial coating | Percent stripped after successive test periods | | | | |
|---|---|---|---|---|---|---|---|---|
| | | | | 80° F. | 80° F. | 100° F. | 120° F. | 140° F. |
| Rhyolite | No | No | Poor | 28 | 45 | 83 | 95 | 98 |
| Do | Yes | No | Fair | 8 | 18 | 35 | 35 | 30 |
| Do | Yes | Yes | Good | 3 | 3 | 3 | 25 | 35 |
| Wisconsin gravel | No | No | Fair | 13 | 30 | 60 | 95 | 98 |
| Do | Yes | No | Good | 8 | 8 | 35 | 45 | 75 |
| Do | Yes | Yes | do | 3 | 8 | 18 | 18 | 35 |
| Virginia granite | No | No | Fair | 13 | 20 | 30 | 45 | 55 |
| Do | Yes | No | Good | 13 | 23 | 25 | 35 | 13 |
| Do | Yes | Yes | do | 3 | 3 | 3 | 13 | 13 |

As may be seen from the above examples, greatly improved adhesion is obtained by the use of lecithin, and even further improvement is secured by pretreating the aggregate with lime. These improved results are evidenced both in the initial coating of wet aggregates and in the resistance of the coated aggregates to stripping in the presence of water. In the coating of dry aggregates, similar improvements in stripping resistance are obtained by the use of a phosphatide, or by the use of a phosphatide in conjunction with lime pretreatment, but improvement in initial coating is usually unnecessary in this case.

It is to be understood, of course, that the above examples are merely illustrative and do not limit the scope of my invention. All types of aggregates may be coated in accordance with my process, and any of the conventional coating procedures may be used instead of the particular procedure of the example. Similarly, other phosphatides or phosphatide concentrates may be employed, and any suitable lime-containing material may be used in place of the slaked lime of the examples. It is also evident that the use of phosphatides to improve adhesion is applicable to all types of bituminous or asphaltic coating compositions and is not limited to the paving compositions used to illustrate my invention. In general, it may be said that the use of any equivalents or modifications of procedure which would naturally occur to one skilled in the art is included in the scope of my invention. Only such limitations should be imposed on the scope of my invention as are indicated in the appended claims.

I claim:

1. A process for coating mineral aggregate which comprises treating the aggregate with lime and coating the lime-treated aggregate with a bituminous cut-back in the presence of a phosphatide.

| Aggregate | Lecithin | Lime | Initial coating | Percent stripped after successive test periods | | | | |
|---|---|---|---|---|---|---|---|---|
| | | | | 80° F. | 80° F. | 100° F. | 120° F. | 140° F. |
| Rhyolite | No | No | Poor | 28 | 45 | 83 | 95 | 98 |
| Do | Yes | No | Fair | 18 | 20 | 25 | 25 | 15 |
| Do | Yes | Yes | Good | 3 | 3 | 3 | 13 | 8 |
| Wisconsin gravel | No | No | Fair | 13 | 30 | 60 | 95 | 98 |
| Do | Yes | No | Good | 3 | 13 | 18 | 23 | 55 |
| Do | Yes | Yes | do | 3 | 3 | 8 | 13 | 25 |
| Virginia granite | No | No | Fair | 13 | 20 | 30 | 45 | 55 |
| Do | Yes | No | Good | 8 | 13 | 18 | 35 | 8 |
| Do | Yes | Yes | do | 3 | 3 | 8 | 13 | 13 |

2. The process of claim 1 in which the phosphatide is lecithin.

3. A process for coating mineral aggregate with an asphaltic coating composition of improved adhesive properties which consists in applying to said aggregate an asphalt cut-back containing from 0.5% to 5.0% of a phosphatide based on the weight of said cut-back.

4. The process of claim 3 in which the phosphatide is lecithin.

5. A process for coating mineral aggregate which comprises treating the aggregate with a lime-containing material in an amount equivalent to 0.1% to 0.5% $Ca(OH)_2$ based on the weight of the aggregate, and coating the lime-treated aggregate with an asphalt cut-back containing from 0.5% to 5.0% of a phosphatide based on the weight of said cut-back.

6. The process of claim 5 in which the phosphatide is lecithin.

7. A coated mineral aggregate, comprising crushed mineral matter, the individual pieces of which have a coating of asphalt bonded thereto by lime and lecithin.

8. An asphaltic coating composition having improved adhesive properties and adapted for application to mineral aggregate, consisting of asphalt, a hydrocarbon solvent therefor, and 0.5% to 5.0% of a phosphatide based on the weight of said coating composition.

9. An asphaltic coating composition having improved adhesive properties and adapted for application to mineral aggregate, consisting of an asphalt cut-back and 0.5% to 5.0% of lecithin based on the weight of said cut-back.

BRUCE WEETMAN.